April 19, 1927.

J. B. HENDERSON

GYROCOMPASS

Filed Aug. 29, 1919

April 19, 1927.  J. B. HENDERSON  1,625,361
GYROCOMPASS
Filed Aug. 29, 1919    2 Sheets-Sheet 2

Fig. 2.

INVENTOR
James B. Henderson
BY
Denny Moseley
ATTORNEY

Patented Apr. 19, 1927.

1,625,361

UNITED STATES PATENT OFFICE.

JAMES BLACKLOCK HENDERSON, OF LEE, ENGLAND.

GYROCOMPASS.

Application filed August 29, 1919, Serial No. 320,681, and in Great Britain May 19, 1919.

This invention relates to improvements in gyro compasses and has for its object the elimination of the errors due to any periodic motion of the ship, airship or airplane upon which the compass is mounted.

In gyro compasses as heretofore constructed, one of the chief objections to their use has been the deviation introduced in rolling or pitching motion of the ship, airship or airplane upon which the compass is mounted. In order to overcome this deviation, modifications have been suggested and used, involving the use of several gyroscopes upon the compass with the object of reducing the couple about the vertical axis which produces the deviation. The arrangement of multiple gyroscopes reduces the arm of this couple. More specifically, it is the object of my invention to reduce this disturbing couple by annulling the forces of the couple when using a single gyroscope. The compasses heretofore constructed have been employing pendular devices for providing the gravity control upon the gyroscopes as was first used by Foucault. In the arrangement according to my invention the gravity control is provided by a fluid system, the difference between it and the pendulum being that the gravity control is normally in neutral equilibrium and the gravity forces accumulate slowly as the axis of the gyroscope tilts from the horizontal plane, or in other words, the gyroscope and the fluid system are both in neutral equilibrium until it tilts from its normal position.

It is also the object of my invention to provide a follow-up system which is continually oscillating about the vertical axis without the introduction of any sources of power other than that required to drive the gyroscope rotor with the object of reducing the friction upon the vertical trunnions of the gyroscope. It is further an object to provide this follow-up system without any mechanical connection between it and the gyroscope.

It is also an object of my invention to introduce an oscillating frame for supporting the horizontal trunnions of the gyroscope with the object of reducing the friction of the same, the said oscillation being obtained by the power supplied to the gyroscope rotor.

It is the further object of my invention to provide the forces required to damp the oscillation of the compass by means of power taken from the gyroscope rotor by improved devices.

Other objects of the invention will be apparent from the detail description hereinafter to follow and with these and other objects in view, the invention consists of the constructions herein described and specifically pointed out in the appended claims.

The gyroscope comprising a gyro wheel 1 within its case 2 is only partially shown and is of the usual construction driven by three phase electric currents as will be later referred to. The case 2 is supported upon two pivots 3 and 4; the pivot 3 rests in a conical recess or depression 5 in a boss 6 carried by a ring 7; the pivot 4 rests in a V groove 8 in a boss 9 also carried by the ring 7. The two bosses 6 and 9 and the conecting ring 7 are supported on two ball bearings 10 and 11 in a gimbal ring 12. This gimbal ring 12 and the parts hereinafter described associated therewith is thus able to make a complete turn around the horizontal trunnions of the gyroscope whereas for small oscillations of the gimbal ring, the ball bearings 10 and 11 are not brought into play, the oscillation being taken by the motion of the pivots 3 and 4 relatively to the ring 7. It is also evident that since the pivot 3 is mounted in a cone shape seat and the pivot 4 in a V groove 8, the gyroscope casing is permitted to expand or contract without affecting the sensitiveness of its mounting.

The inner gimbal ring 12 is carried by the follow-up ring 13 which forms a part of the follow-up system as will later be referred to, upon two ball bearings 14 and 15 about the vertical axis, the weight being carried by the suspension wire 16 in a manner well known in the art. The follow-up ring 13 is supported by a ring 17 on ball bearings 18 and 19 about the vertical axis. The bearing 19 has a thrust ball 20 upon which the post 21 carried by the ring 13 rests, which bearing supports the weight of the gyroscope, its gimbal rings and follow-up ring. The ring 17 is carried by ordinary gimbal rings, one of which 22 is carried upon horizontal trunnions 23 as is the usual construction.

The gyro casing 2 has three ports 24 for the admission of air and three jets of air emerge from the case through orifices 25, 26 and 27. The jet emerging through the orifice 25 serves to actuate the follow-up mechanism, the jet emerging through the orifice 26 serves to damp the oscillation of the compass and the jet through the orifice 27 serves to oscillate the ring 7, thus reducing the friction upon the pivots 3 and 4.

Referring first to the follow-up mechanism, the jet from the orifice 25 passes through a passage 28 in the boss 9 and upon emerging from the passage 28 it enters a cylindrical chute 29 carried by the follow-up ring 13. This chute consists of a hollow cylindrical box having a closed bottom 29ª, see Fig. 5, and divided vertically by a diaphragm 30. The box has two apertures 31 and 31ª at its closed end which are diametrically opposite in a horizontal plane. The diaphragm 30 is helical in form and twists through 180 degrees in the length of the box 29 so that the air entering on the near side of the diaphragm leaves the box through the hole 31 which is on the far side of the diaphragm and vice versa. Thus the jet emerging from the passage 28 tends to keep the box 29 co-axial with the jet and when the ring 12 precesses as will be further described, this jet of air causes the follow-up element to remain in alignment with the ring 12 since any relative movement between the two rings will cause the air jets emerging from openings 31 to be unequal and cause a torque which will act on ring 13 to cause it to follow ring 12.

The jet from the orifice 27 enters a chute 32 carried by the ring 7, similar in all respects to the chute 29. The ring 7 is thus kept in register with the jet emerging from orifice 27 and is continually oscillating due to the eddies in the air jet. It, therefore, tends to eliminate the friction upon the pivots 3 and 4.

The jet 26 which operates the damping mechanism is associated with the gravity control system which will now be described. This system consists of two vertical cylindrical tubes, or vessels, 50 and 51 provided with glass windows 52. The tops of these tubes are closed by screw covers 53 each of which contain a ball valve 54 (see Fig. 3) which permits the ingress of air and prevents the leakage of the fluid within the tubes as will be later referred to.

The two tubes 50 and 51 are inter-connected by a curved tube 55 and a rod 56, which encircle the gyro casing. The bore of the tube 55 is small in diameter as shown by the dotted line in Fig. 1 of the drawing to provide a capillary tube. The combination of the tubes, or vessels, 50, 51 and 55 forms a level which is partially filled with viscous fluid such as mercury and the capillary tube 55 insures that the passage of fluid from one tube to another will take place at a very slow rate. This fluid system is supported by two brackets 57 and 58 connected respectively to the tube 55 and the rod 56. These brackets are supported on small trunnion pivots 59 and 60 carried by ball bearings 61 and 62 affixed to the gyro casing. One of these ball bearings is shown in detail in Fig. 4. The level is adjusted so that it is normally in neutral equilibrium on the trunnions 59 and 60, the adjustment being made by the adjustable weights 63 and 64. The motion of the level about this trunnion axis is constrained by two springs 65 and 66 which are connected at one end to the rod 56 and at their other ends to adjustable hooks 67 and 68 carried by the gyroscope casing 2, whereby the tension of these springs may be adjusted. The bracket 57 carries a chute 70 which is of a pattern similar to the chute 29 already described. This chute is pivoted about an axis 71 and can be angularly adjusted by means of a screw 72 so that the diametral partition across the chute 70 is centrally disposed with respect to the jet. The jet emerging from the orifice 26 enters the chute 70 and tends to cause the level to follow the gyro case when it tilts in addition to the constraint supplied for this purpose by the springs 65 and 66. The jet on emerging from the lower end 73 in the chute 70 also supplies the forces required to damp the oscillation of the compass as will be described in the operation of the compass.

The torsional stiffness of the suspending wire 16 is reduced or annulled by means of a cross spring 75 which connects the bracket 76 attached to the follow-up ring 13 and the bracket 77 attached to the inner gimbal ring 12. It will be evident that any tension in this spring 75 applies torsional instability between the two rings 12 and 13 and by making the torsional instability due to the spring 75 equal to the torsional stability produced by the suspension 16, the connection between elements 12 and 13 may be torsionally neutral and thus reduce the forces on the gyroscope due to any lag of the follow-up system.

As is the usual construction the follow-up element 13 carries a compass card 80 which is read opposite the lubber's line 81 carried by the outside ring 17.

The suspension 16 is attached at its upper end to a bolt 82 which may be raised or lowered by the nuts 83 and may be turned by a screw adjustment 84, the screw 84ª being supported by a lug 84ᵇ on a bracket 84ᶜ carried by the sleeve 84ᵈ. The screw acts through an arm 84ᵃ attached to the bolt 82.

A mirror 85 is attached to the gyro casing 2 for the purpose of detecting small deflections by making adjustment of the compass.

The three phase electrical connections are conveyed to the gyroscope as follows: one to the trunnion bearing 23 by wire 23ᵃ, second to the trunnion ring 22 of the gimbal ring by wire 22ᵃ, and the 3rd to ground by wire 22ᵇ.

Phase one is connected to the lubber's line 81 by wire 81ᵃ and the brush 86 to the insulated bolt 82 and the metallic suspension 16, thence to the insulated bushing 87 from the ring 12, then by a wire connection 87ᵃ to the outer race of the ball bearing 10 through the balls to the inner race, thence by a wire to the flexible connection 88 between the rings 7 and the gyro compass 2, then by the usual wire connection to the gyro stator.

Phase two passes by a wire 23ᵃ which is connected with the trunnion 23 which is connected by a wire 23ᵇ passing along the ring 17 to the insulated ball bearings 19 and 20 to the pivot 21 which is insulated and contains a small mercury cup 91 through which the current passes to the insulated vertical pivot 15, thence it is conveyed by a wire along the ring 12 to a ball bearing 11 and through this ball bearing in a similar manner to that already described for phase one, the current passing through the flexible connection 90 to the gyro stator.

The 3rd phase which is grounded, passes through the ball bearings of the outer gimball rings to the ring 17, thence through the mercury in the ball bearing 18 to the ring 13, thence through bracket 76, the spring 75 and bracket 77 to the ring 12 (see Fig. 2), thence through the spring connection 95 to an insulated connection passing through the boss 6, thence through flexible connection 89 to the gyro case. The ground circuit may also pass from the bore 6 through the pivots 3 to the gyro casing but a wire connection is preferable to avoid an excess of current passing through pivot 3.

Figure 2:
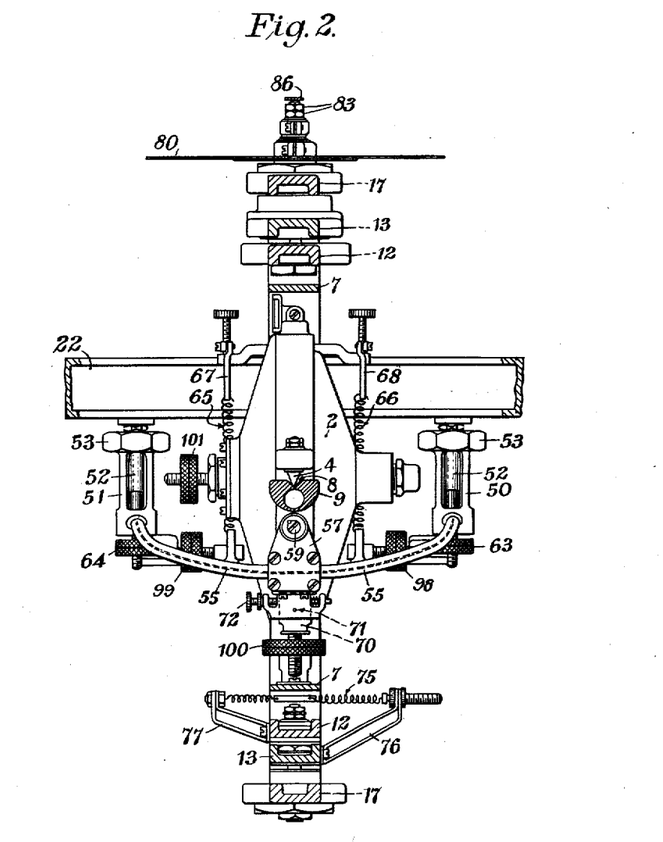
Figure 2 is a side elevation partially in section on the line AB of Figure 1.

The level in addition to having the balanced weights 63 and 64 for raising and lowering the center of gravity, is fitted also with the balancing weights 98 and 99 in Figure 2 for moving the center of gravity horizontally. The gyro case is also provided with balanced weights 100 for raising and lowering the center of gravity and 101 for the horizontal adjustment of the center of gravity.

To use the compass, the level is first balanced so that when the liquids stand at equal heights in the two tubes 50 and 51, the level is in neutral equilibrium on its trunnions 61 and 62. This adjustment is made by means of the adjustable weights 63 and 64, 98 and 99. The springs 65 and 66 are then fitted to control the motion of the level relatively to the gyro case and are adjusted so that when the gyro axis is horizontal the liquid stands at equal heights in the tubes 50 and 51. The gyro case is then balanced by means of the weights 100 and 101 so that it is in neutral equilibrium on its pivots 3 and 4 and the gyroscope together with the ring 7 and the ring 12 relatively adjusted so that when the compass becomes inclined, the balance about the inclined vertical trunnions is perfect. This adjustment may be made by the screw adjustments provided in the ring 12 for the axial motion of the two bosses 6 and 9. The follow-up 13 is also balanced on its vertical trunnions. The electrical connections having been connected, the power can be switched on to the gyroscope and the compass is ready for action. The connections are so made that the direction of rotation of the gyro rotor is in the opposite sense to the rotation of the earth.

*Operation of the gyro-compass.*

Figures 1, 3, 4, 5:
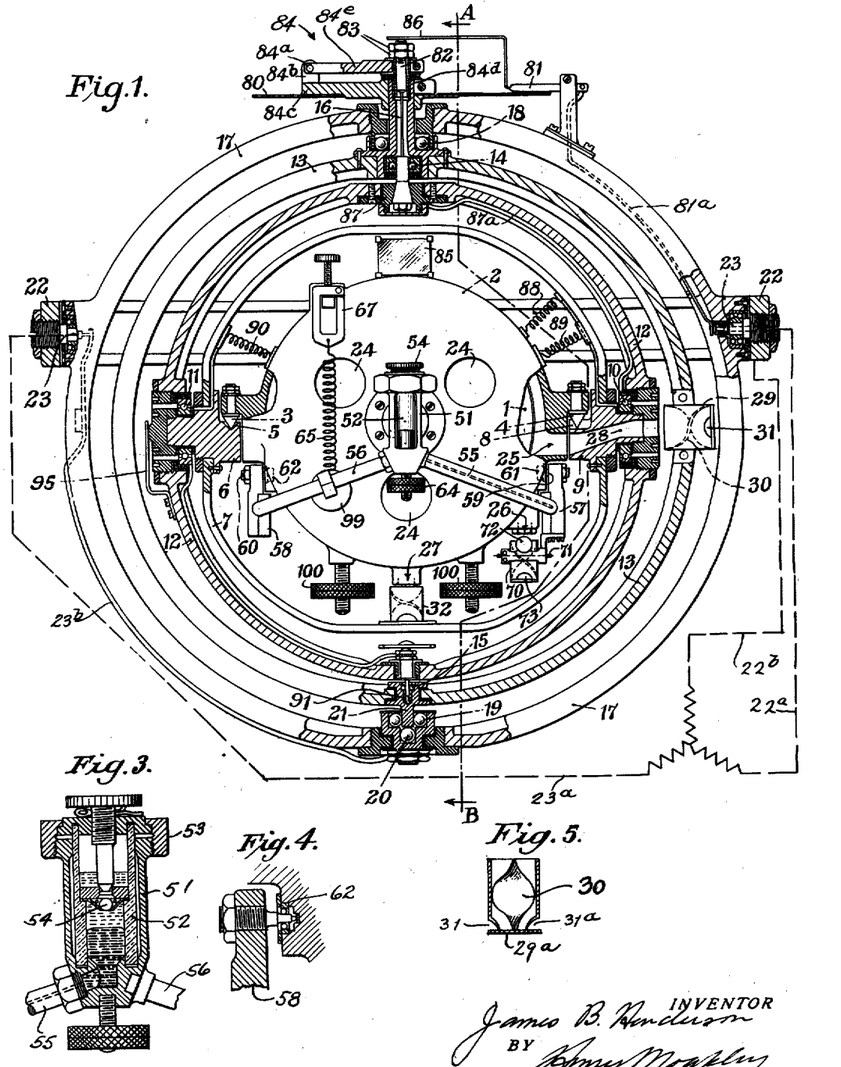
Figure 1 is an elevation of the gyro compass viewed from the north side, parts being shown in section for clearness.
Fig. 3 is a detail of the cup containing the liquid forming part of the level.
Fig. 4 is a detail of the ball bearing support for the bracket which carries the level.
Fig. 5 is a detail of the chute or deflector.

Fig. 1 represents a view of the north side of the compass, the rotor revolving clockwise, i. e., in a direction opposite to the earth's rotation. Assume that the gyro is set up with the rotor revolving and with its axis horizontal and deflected from the meridian, say to the east side. Assume, first of all, that the damping nozzle 26 is blocked. The gyro and the fluid gravity control system it carries are together in neutral equilibrium on the pivots 3 and 4 so that the rotor axis tends to maintain a constant direction in space. The horizontal plane, however, does not maintain a constant direction in space but rotates about the N.—S. horizontal line with a velocity $\omega \cos \lambda$ in which $\omega$ is one revolution every 24 hours and $\lambda$ is the latitude so that if the latitude is 60° the horizontal plane makes one revolution about the N.—S. line every 48 hours. The gyro axis maintaining its direction in space gradually acquires a tilt relatively to the horizontal plane not due to a precessional motion but due to the horizontal plane moving away from it. Thus if the north end be to the east of the meridian it gradually acquires an upward tilt. The fluid in the tubes 55 then flows from vessel 51 to vessel 50 and the level then acquires a further tilt in the same direction as the tilt of the gyro, this further tilt being constrained by the springs 65 and 66 and being proportional to the tilt of the gyro. The center of gravity of the system has, therefore, been moved parallel to the rotor axis and corresponds to moving a weight along that axis by an amount proportional to the tilt of the gyro.

This extra weight on the south end of the gyro causes the rotor axis to precess toward the meridian but so long as the rotor axis is to the east of the meridian, the weight on the S. end and the velocity of precession it produces continue to increase, and the rotor axis passes the meridian with considerable tilt and horizontal velocity. The horizontal plane on the west side, however, is rising and the tilt gradually diminishes, reducing the weight on the south end and the horizontal precessional velocity until the rotor axis again becomes horizontal when its deviation to the west is equal to its initial deviation to the east.

The rotor axis then acquires a downward tilt due to the horizontal plane on the west side continuing its upward motion and the rotor axis traces out below the horizontal plane an elliptical path which is similar to the path which it previously traced out above the horizontal plane. The north end of the rotor axis thus traces out an ellipse relatively to the meridian the short vertical axis of the ellipse being in the meridian. The longer horizontal axis of the ellipse would not be exactly in the horizontal plane if the gyro were exactly in neutral equilibrium when set up with its rotor axis horizontal, it would be slightly above the horizontal plane by an amount sufficient to produce a weight on the south end sufficient to cause a precession round the vertical equal to $\omega \sin \lambda$, which is the angular velocity of the meridian round the vertical due to the rotation of the earth. This steady small zero tilt may be compensated by the addition of a small weight on the south end of the gyro. This is a common correction for latitude at present used and does not form an essential feature of the invention apart from its use of the other combinations shown.

The air jet emerging from nozzle 26 has the function of damping out this elliptic motion of the gyro axis so that it takes up the steady position represented by the center of the ellipse. The air jet divides upon the E.—W. diametral partition across the chute 70 and the southern portion of the jet emerging through the hole in the chute being projected to the north, the northerly portion emerging through the opposite hole and being projected to the south. If these two portions are equal no torque will act upon the gyro about the vertical axis but if the chute 70 is deflected relatively to the gyro by a flow of fluid or other cause the two jets leaving the chute will be unequal and a torque about the vertical will result. The flow of fluid in normal working is proportional to the tilt of the gyro axis, hence the air jet from 26 will produce a torque about the vertical proportional to the tilt of the gyro axis. This torque is in the direction to introduce a precession which reduces the tilt. The end of the rotor axis then instead of describing continuously its elliptic orbit describes a spiral path towards the center of the orbit, and remains there.

The gravity control couples and the damping couples are produced by a constricted flow of fluid from one vessel to the other and this flow is arranged to be so slow that during the periodic accelerations of the gyro due to rolling or pitching of the ship the flow which takes place is negligible. The couples on the gyro produced by the periodic rolling or pitching are thus confined to the alternating couple produced by the excess weight on the south end of the axis and there is no cumulative component torque either about the vertical or horizontal axis due to rolling or pitching when following a quadrantal course such as exists in all compasses in which the gyroscope has pendular or inverted pendular control.

The damping of the oscillation of gyro compasses having pendular control which produces torque about the vertical to damp the oscillation has in the past been limited by deviations of the compass produced by the damping mechanism when the ship is accelerated along the meridian. These deviations are not produced simultaneously with the acceleration. The acceleration produces a torque about the vertical through the damping mechanism which tilts the gyro axis and a deviation of the compass results quarter a period later. In my compass no ballistic or suddenly applied torque can be brought into action by acceleration of the ship and the damping can, therefore, be increased greatly. It can be increased until the motion is simply dead-beat. It can, however, be increased still further as follows:

It will be evident from the arrangement of the air-chute 70 that the air-jet emerging from the nozzle 26 serves to constrain the fluid containers relatively to the gyro case, thus assisting the action of the springs 65 and 66. If the jet 26 be increased the spring forces may be diminished thus increasing the damping couples and diminishing the gravity control couples and if the jet be increased until it controls the level without springs only the couples about the vertical remain. The gyro then only oscillates vertically and its position of rest is with its axis tilted by an amount proportional to the deviation from the meridian. The amount of this tilt being proportional to the tilt by the level relatively to the gyro case can be read off on a convenient scale and the deviation of the compass from the meridian is thereby known. The gyro moves very slowly towards the meridian due to the earth's rotation the velocity with which it approaches the meridian being $\omega$ cosine of the tilt of the rotor axis. This phase of the invention is more clearly described in my application Serial No. 382,676, filed May 19, 1920.

I claim:

1. In a gyro compass, a gyroscope, a follow-up element associated with said gyroscope and fluid pressure means acting directly upon the follow up element for causing said follow-up element to follow said gyroscope.

2. In a gyro compass, a gyroscope, a follow-up element within which the gyroscope is mounted, fluid pressure means directly connecting the gyroscope and the follow-up element for causing the element to follow the gyroscope and fluid pressure means for damping the oscillations of the gyroscope.

3. In a gyro compass, a gyroscope, a casing for said gyroscope, a follow-up element and means associated with said gyroscope casing and said follow-up element for causing a jet of air discharged from said casing to act directly upon the follow-up element to cause it to follow said gyroscope and its casing.

4. In a gyro compass, a gyroscope, a casing for said gyroscope having an air inlet and an air outlet, a supporting ring surrounding said gyro casing and provided with a passage registering with the outlet, pivotal connections between said casing and said ring, a follow-up element surrounding said ring and a chute carried by said follow-up element arranged in alignment with said passage whereby the air directed towards said chute will cause said follow-up element to remain in alignment with said gyro casing and said ring.

5. In a gyroscopic instrument, a gyroscope, a member within which the gyroscope is mounted, a second member on which the first named member is mounted, one of said members being provided at one side of the instrument with a substantially conical recess, a pin associated with the other member and coacting with the recess, one of said members being provided at the other side of the instrument with an elongated recess, and a pin associated with the other member and coacting with the last named recess.

6. In a gyro compass, a gyroscope and its casing, a ring surrounding said gyro casing and supporting said gyroscope and its casing upon a horizontal axis, a second ring surrounding said first named ring and supporting said first named ring about a horizontal axis, said second named ring being supported upon a vertical axis and an unstable shiftable mass carried by said gyro casing for applying a gravity couple to said gyroscope to cause it to precess.

7. In a gyro compass, a gyroscope, an element associated with the gyroscope for applying a gravity couple to the gyroscope to cause it to precess, an inner supporting ring for the gyroscope and the element, and outer supporting rings for the inner supporting ring and the gyroscope, said outer rings being capable of making a complete rotation vertically around the gyroscope without affecting the gyroscope and the element.

8. In a gyro compass, a gyroscope consisting of a three phase electrical machine, a casing for the gyroscope, a ring surrounding the casing and supporting the gyroscope upon a horizontal axis, a second ring surrounding the first ring and supporting the same upon a horizontal axis coincident with the first named axis, said second ring being supported upon a vertical axis, and means for conducting the current to said machine through the horizontal axes without interfering with the freedom of rotation of the second ring about the gyroscope and the first named ring.

9. In a gyro compass, a gyroscope consisting of a three phase electrical machine, a ring upon which the gyroscope is supported, a second ring upon which the first named ring is supported in such a manner that it may be rotated completely around the first named ring and circuit connections for conducting the current to the machine in all positions of the second ring with respect to the first.

10. In a gyro compass, a gyroscope comprising a rotating element and a casing provided with an aperture through which a blast of air may be discharged from the casing, a member upon which the casing is supported upon bearings, and means upon the member and co-acting with the air blast from the casing for causing oscillatory movement between the member and the casing to eliminate the effect of friction upon the bearings.

11. In a gyro compass, the combination of a gyroscope, a ring upon which the gyroscope is supported upon a horizontal axis, a second ring upon which the first named ring is supported about a vertical axis consisting of a suspension wire, and means for overcoming the torsion of the wire upon relative movement between the rings consisting of a member attached to each of the rings and a spring connected between the two members.

12. In a gyro compass, a gyroscope consisting of an electric motor, a casing for the gyroscope, a ring within which the casing is supported, a second ring surrounding the first ring and supporting the same upon a horizontal axis, and means for conducting the current to said motor through the axes without interfering with the freedom of rotation of the second ring about the gyroscope, casing and first ring.

13. In a gyro compass, a gyroscope consisting of an electric motor, a ring upon which the gyroscope is supported, a second ring upon which the first ring is supported in such a manner that it may be rotated completely around the first ring and gyroscope and circuit connections for conducting current to the motor in all positions of the second ring with respect to the first ring and gyroscope.

14. In a gyro compass, the combination of a gyroscope consisting of a rotating element and a casing, a member on which the gyroscope is mounted for oscillation about a horizontal axis, a second member on which the first named member is mounted for turning about a vertical axis and means for causing a jet of air produced by the rotation of the element within the casing to act directly upon the second member to cause it to follow the movements in azimuth of the gyroscope.

15. In a gyro compass, the combination of a gyroscope consisting of a rotating element and a casing provided with an aperture through which an air jet may be discharged, a member upon which the gyroscope is supported for oscillation about a horizontal axis, a second member on which the first named member is mounted for turning about a vertical axis and means for causing the air jet to act directly upon the second member to cause it to follow the movements in azimuth of the gyroscope.

16. In a gyro compass, the combination of a gyroscope comprising a rotating element and a casing having an air inlet and an air outlet, a member for supporting the gyroscope for oscillation about a horizontal axis, a second member on which the first named member is mounted for turning about a vertical axis and a device associated with the second member and having a dividing diaphragm in the path of the air discharged from the casing through the outlet to cause the second member to follow the movements in azimuth of the gyroscope.

17. In a gyro compass, the combination of a gyroscope consisting of a rotating element and a casing having an air inlet and an air outlet, a member on which the gyroscope is mounted, means for mounting the gyroscope and member for oscillation about a horizontal trunnion axis, one of the trunnions of said axis being provided with a passage for the discharge of air from the air inlet of the casing, a second member on which the mounting means is mounted for turning about a vertical axis and a device associated with said last named member and co-acting with the air discharged from the said trunnion for causing said member to follow the movements in azimuth of the gyroscope.

18. In a gyro compass, a gyroscope consisting of a rotating element and a casing provided with an aperture through which a vertically directed jet of air may be discharged, a member on which the gyroscope is mounted for oscillation about a horizontal axis, a normally balanced shiftable device mounted on the casing and means associated with the device and co-acting with the air jet for applying upon relative movement between the casing and the device a direct torque about a vertical axis to cause precession about the horizontal axis.

19. In a gyro compass, a gyroscope consisting of a rotating element and a casing provided with an aperture through which a vertically directed jet of air may be discharged, a member on which the gyroscope is mounted for oscillation about a horizontal axis, a normally balanced shiftable device mounted on the casing, means associated with the device and co-acting with the air jet for applying upon relative movement between the casing and the device a direct torque about a vertical axis to cause precession about the horizontal axis and means for adjusting the torque applying means in relation to the air jet.

20. In a gyro compass, a gyroscope consisting of a rotating element and a casing provided with an aperture through which a vertically directed jet of air may be discharged, a member on which the gyroscope is mounted for tilting about a horizontal axis, a normally balanced shiftable mass mounted on the casing, a connection between the mass and the casing for applying a torque about the horizontal axis to cause precession about a vertical axis when the gyroscope tilts and means associated with the mass and co-acting with the air jet for applying a torque about the vertical axis to cause precession of the gyroscope about the horizontal axis.

21. In a gyro compass, a gyroscope comprising a rotating element and a casing provided with an aperture through which a vertically directed jet of air may be discharged, a member on which the gyroscope is mounted for oscillation about a horizontal axis, a liquid level device pivotally mounted on the casing and comprising a pair of receptacles connected by a restricted passage and means associated with the device and co-acting with the air jet for applying upon relative movement between the casing and the device a direct torque about a vertical axis to cause precession of the gyroscope about the horizontal axis upon relative movement between the device and the gyroscope.

22. In a gyro compass, a gyroscope consisting of a rotating element and a casing, a member on which the gyroscope is mounted for tilting about a horizontal axis, a liquid level device comprising a pair of members pivotally mounted at opposite points on the periphery of the casing and a receptacle connected to the ends of the members on each side of the casing, one of said members being provided with a bore of relatively small diameter in communication with the receptacles, means for adjusting the device in normal neutral equilibrium and means effective upon tilt of the gyroscope for causing the device to apply a torque about the horizontal axis.

23. In a gyro compass, a gyroscope consisting of a rotating element and a casing, a member on which the gyroscope is mounted for tilting about a horizontal axis, a liquid level device comprising a pair of members pivotally mounted at opposite points on the periphery of the casing and a receptacle connected to the ends of the members on each side of the casing, one of said members being provided with a bore of relatively small diameter in communication with the receptacles, means for adjusting the device in normal neutral equilibrium and a resilient connection between the casing and the device for applying a torque about an axis of the gyroscope upon relative movement between the device and the gyroscope.

24. In a gyro compass, a gyroscope consisting of a rotating element and a casing provided with an aperture through which a vertically directed jet of air may be discharged, a member on which the gyroscope is mounted for tilting about a horizontal axis, a liquid level device comprising a pair of members pivotally mounted at opposite points on the periphery of the casing and a receptacle connected to the ends of the members on each side of the casing, one of said members being provided with a bore of relatively small diameter in communication with the receptacles, means effective upon tilt of the gyroscope about the horizontal axis for causing the device to apply a torque about said axis and means associated with one of the members and co-acting with the air jet for applying a torque about a vertical axis.

25. In a gyro compass, the combination of a gyroscope, a member upon which the gyroscope is supported upon a horizontal axis, a second member upon which the first named member is supported about a vertical axis including a suspension wire and means connected between the members for overcoming the torsion of the wire upon relative movement between the members.

26. In a gyro compass, a gyroscope, a member upon which the gyroscope is supported for tilting about a horizontal axis, a second member, supporting connections between the members permitting relative rotation of one with respect to the other about a horizontal axis, means for supporting the second member for turning about a vertical axis and means associated with the gyroscope for applying a gravity couple thereto.

27. In a gyro compass, a gyroscope consisting of a rotating element and a casing, members attached to the casing and provided with knife edges, a supporting member on which the knife edges rest, a second supporting member on which the first member is mounted in rotary bearings and a third supporting member on which the second member is mounted for turning about a vertical axis.

28. In a gyro compass, a gyroscope, a follow-up element within which the gyroscope is mounted, fluid pressure means directly connecting the gyroscope and the follow-up element for causing the element to follow the gyroscope, fluid pressure means for damping the oscillations of the gyroscope and fluid pressure means for eliminating the effect of friction at the supporting bearings of the gyroscope.

29. In a gyro compass, a gyroscope comprising a rotating element and a casing having outlets for air jets, a follow-up element, means for mounting the gyroscope in the follow-up element, means associated with the follow-up element and coacting with one of the air jets to cause the element to follow the gyroscope and means carried by the casing and coacting with another of the air jets for damping oscillations of the gyroscope.

30. In a gyro compass, a gyroscope comprising a rotating element and a casing having outlets for air jets, a follow-up element, means for mounting the gyroscope in a follow-up element, means associated with the follow-up element and coacting with one of the air jets to cause the element to follow the gyroscope and means associated with the mounting means and coacting with another of the air jets for eliminating the effect of friction at the supporting bearings of the gyroscope.

31. In a gyro compass, a gyroscope comprising a rotating element and a casing having outlets for air jets, a follow-up element, means for mounting the gyroscope in the follow-up element, means associated with the follow-up element and coacting with one of the air jets to cause the element to follow the gyroscope, means carried by the casing and coacting with another of the air jets for damping oscillations of the gyroscope and means associated with the mounting means and coacting with another of the air jets for eliminating the effect of friction at the supporting bearings of the gyroscope.

32. In a gyroscopic instrument, a gyroscope consisting of a rotating element and a casing provided with knife-edge trunnions, a member on which the casing is supported on the trunnions, a second member on which the first member is supported on the trunnions in line with the axis of the knife-edge trunnions and means to cause the first member to follow movements of the casing about said axis.

33. In a gyroscopic instrument, a gyroscope consisting of a rotating element and a casing, a member on which the gyroscope is mounted on a horizontal axis, a second member on which the first member is mounted for turning about a vertical axis, and means for causing jets of air produced by the rotation of the element within the casing to act directly upon the members to cause them to follow the movements of the gyroscope about their respective axes.

JAMES BLACKLOCK HENDERSON.

trunnions and means to cause the first member to follow movements of the casing about said axis.

33. In a gyroscopic instrument, a gyroscope consisting of a rotating element and a casing, a member on which the gyroscope is mounted on a horizontal axis, a second member on which the first member is mounted for turning about a vertical axis, and means for causing jets of air produced by the rotation of the element within the casing to act directly upon the members to cause them to follow the movements of the gyroscope about their respective axes.

JAMES BLACKLOCK HENDERSON.

Certificate of Correction.

Patent No. 1,625,361. Granted April 19, 1927, to

JAMES BLACKLOCK HENDERSON.

It is hereby certified that error appears in the printed specification of the above-numbered patent requiring correction as follows: Page 4, line 120, for the word "by" read of; and that the said Letters Patent should be read with this correction therein that the same may conform to the record of the case in the Patent Office.

Signed and sealed this 11th day of October, A. D. 1927.

[SEAL.] M. J. MOORE,
*Acting Commissioner of Patents.*

Certificate of Correction.

Patent No. 1,625,361. Granted April 19, 1927, to

JAMES BLACKLOCK HENDERSON.

It is hereby certified that error appears in the printed specification of the above-numbered patent requiring correction as follows: Page 4, line 120, for the word " by " read *of;* and that the said Letters Patent should be read with this correction therein that the same may conform to the record of the case in the Patent Office.

Signed and sealed this 11th day of October, A. D. 1927.

[SEAL.] M. J. MOORE,
*Acting Commissioner of Patents.*